(12) United States Patent
Ronen et al.

(10) Patent No.: US 10,936,630 B2
(45) Date of Patent: Mar. 2, 2021

(54) INFERRING TOPICS WITH ENTITY LINKING AND ONTOLOGICAL DATA

(71) Applicant: Microsoft Technology Licensing, LLC, Redmond, WA (US)

(72) Inventors: Royi Ronen, Tel-Aviv (IL); Oron Nir, Tel-Aviv (IL); Chin-Yew Lin, Beijing (CN); Ohad Jassin, Tel-Aviv (IL); Daniel Nurieli, Tel-Aviv (IL); Eylon Ami, Givatayim (IL); Avner Levi, Kiryat Ono (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 264 days.

(21) Appl. No.: 16/130,992

(22) Filed: Sep. 13, 2018

(65) Prior Publication Data
US 2020/0089802 A1 Mar. 19, 2020

(51) Int. Cl.
| | |
|---|---|
| *G06F 16/00* | (2019.01) |
| *G06F 16/28* | (2019.01) |
| *G06F 16/22* | (2019.01) |
| *G06F 17/18* | (2006.01) |
| *G06K 9/00* | (2006.01) |
| *G06N 3/08* | (2006.01) |

(Continued)

(52) U.S. Cl.
CPC ........ *G06F 16/287* (2019.01); *G06F 16/2228* (2019.01); *G06F 17/18* (2013.01); *G06K 9/00221* (2013.01); *G06N 3/088* (2013.01); *G06N 5/046* (2013.01); *G10L 15/005* (2013.01); *G10L 15/26* (2013.01)

(58) Field of Classification Search
CPC .... G06F 16/287; G06F 16/2228; G06F 40/42; G06F 16/483; G06F 16/784; G06F 16/685; G06N 20/00; G06N 3/088; G06N 5/046; G06K 9/00221; G10L 15/005; G10L 15/26

See application file for complete search history.

(56) References Cited

U.S. PATENT DOCUMENTS 7,165,024 B2 * 1/2007 Glover .................. G06F 16/355
704/9
8,972,404 B1 * 3/2015 Lewis ..................... G06F 16/35
707/737

(Continued)

FOREIGN PATENT DOCUMENTS

| WO | 2012068154 A1 | 5/2012 |
| WO | 2017070656 A1 | 4/2017 |

OTHER PUBLICATIONS

"International Search Report and Written Opinion Issued in PCT Application No. PCT/US19/039650", dated Oct. 16, 2019, 12 Pages.

*Primary Examiner* — Alexander Khong

(57) ABSTRACT

Systems and methods are disclosed for inferring topics from a file containing both audio and video, for example a multimodal or multimedia file, in order to facilitate video indexing. A set of entities is extracted from the file and linked to produce a graph, and reference information is also obtained for the set of entities. Entities may be drawn, for example, from Wikipedia categories, or other large ontological data sources. Analysis of the graph, using unsupervised learning, permits determining clusters in the graph. Extracting features from the clusters, possibly using supervised learning, provides for selection of topic identifiers. The topic identifiers are then used for indexing the file.

20 Claims, 6 Drawing Sheets

(51) Int. Cl.
*G06N 5/04* (2006.01)
*G10L 15/00* (2013.01)
*G10L 15/26* (2006.01)

(56) References Cited

U.S. PATENT DOCUMENTS

| | | | | |
|---|---|---|---|---|
| 9,645,999 | B1* | 5/2017 | Ciulla | G06F 16/35 |
| 10,321,167 | B1* | 6/2019 | Edell | G06F 16/901 |
| 2012/0095952 | A1* | 4/2012 | Archambeau | G06K 9/6249 |
| | | | | 706/52 |
| 2012/0331063 | A1* | 12/2012 | Rajaram | G06Q 50/01 |
| | | | | 709/206 |
| 2013/0159288 | A1* | 6/2013 | Nikankin | G06Q 40/02 |
| | | | | 707/722 |
| 2016/0034748 | A1* | 2/2016 | Wang | G06K 9/00281 |
| | | | | 382/201 |
| 2016/0098395 | A1* | 4/2016 | DuBose | G10L 15/26 |
| | | | | 704/2 |
| 2016/0217201 | A1* | 7/2016 | Hummel | G06F 16/35 |
| 2016/0267166 | A1* | 9/2016 | Kohlmeier | G06F 16/36 |
| 2017/0228654 | A1* | 8/2017 | Skupin | G06F 40/103 |
| 2017/0316012 | A1* | 11/2017 | Glanowski | G06F 16/24578 |
| 2018/0005088 | A1* | 1/2018 | Farfade | G06K 9/6224 |
| 2019/0115106 | A1* | 4/2019 | Rogers | G06Q 50/22 |
| 2019/0236173 | A1* | 8/2019 | Ghatage | G06N 20/00 |
| 2019/0251203 | A1* | 8/2019 | Kondo | G06F 16/9017 |
| 2019/0392055 | A1* | 12/2019 | Rose | G06F 16/144 |

\* cited by examiner

INFERRING TOPICS WITH ENTITY LINKING AND ONTOLOGICAL DATA

BACKGROUND

Searching for specific content among multimodal files, containing both audio and video, can be challenging. Searchers may need to watch the entire length of a video channel to identify the appearance of certain objects, such as images of important people, and further may need to listen to an entire audio track to pick up mentions of certain important topics. Even if a multimodal file is labeled to indicate some content, the label may not indicate positions within the multimodal file (e.g., time indexes within the video channel and/or audio track) where the content may be found. Additionally, if a certain entity gains prominence after a large library of multimodal files had already been initially labeled, the effort required to manually search through the entire library may be prohibitive.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

Some aspects and examples disclosed herein are directed to inferring topics from a multimodal file by: receiving a multimodal file comprising a video portion (a visual channel) and an audio portion (an audio channel); extracting a set of entities from the multimodal file; linking the set of entities to produce a set of linked entities; obtaining reference information for the set of entities; based at least on the reference information, generating a graph of the set of linked entities, the graph comprising nodes and edges; based at least on the nodes and edges of the graph, determining clusters in the graph; based at least on the clusters in the graph, identifying topic candidates; extracting features from the clusters in the graph; based at least on the extracted features, selecting at least one TopicID from among the topic candidates to represent at least one cluster; and indexing the multimodal file with the at least one TopicID.

BRIEF DESCRIPTION OF THE DRAWINGS

The disclosed examples are described in detail below with reference to the accompanying drawing figures listed below.

Corresponding reference characters indicate corresponding parts throughout the drawings.

DETAILED DESCRIPTION

The various embodiments will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

Searching for specific content among multimodal files, containing both audio and video, can be challenging. Searchers may need to watch the entire length of a video channel to identify the appearance of certain objects, such as images of important people, and further may need to listen to an entire audio track to pick up mentions of certain important topics. Even if a multimodal file is labeled to indicate some content, the label may not indicate positions within the multimodal file (e.g., time indexes within the video channel and/or audio track) where the content may be found. Additionally, if a certain entity gains prominence after a large library of multimodal files had already been initially labeled, the effort required to manually search through the entire library may be prohibitive.

Systems and methods are disclosed for inferring topics from a file containing both audio and video, for example a multimodal or multimedia file, in order to facilitate video indexing. A set of entities is extracted from the file and linked to produce a graph, and reference information is also obtained for the set of entities. Entities may be drawn, for example, from Wikipedia categories, or other large ontological data sources. Analysis of the graph, using unsupervised learning, permits determining clusters in the graph. Extracting features from the clusters, possibly using supervised learning, provides for selection of topic identifiers. The topic identifiers are then used for indexing the file.

The disclosure provides a way to infer topics from video files, including video files having an accompanying audio track. The inferred topics are interpretable, so they can be tied back to the text of a transcript of an audio track to provide explanations and/or indices. A large ontology, such as Wikipedia, Bing, and Entity Linking Intelligence Service (ELIS) provides a wide range of entities available for inference. The large library of available entities is scalable, and may be updated by leveraging the natural growth of those other data sources. Some examples offer multi-lingual capability.

Figure 1:
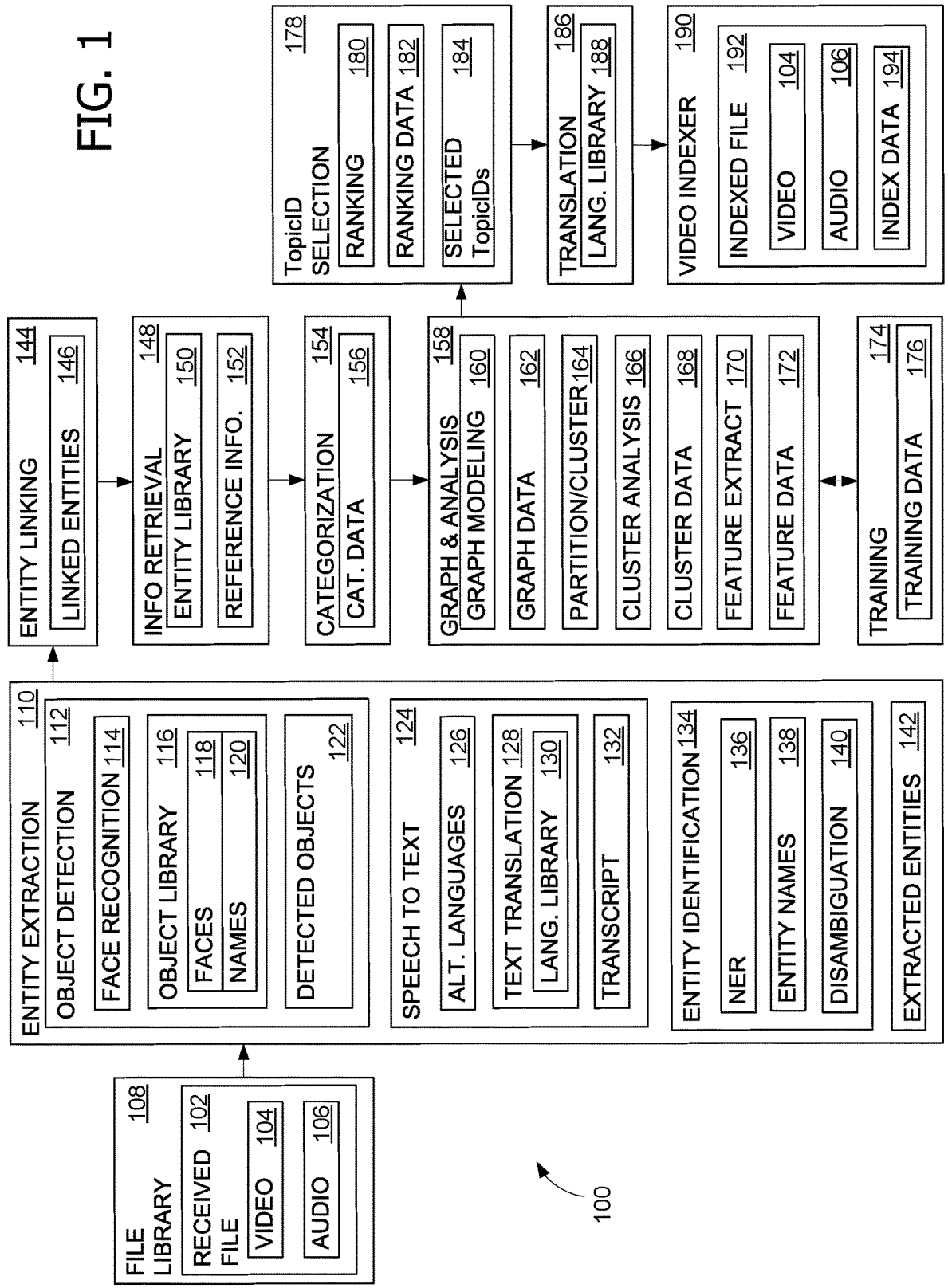
FIG. 1 illustrates an exemplary arrangement for inferring topics from a multimodal file.

FIG. 1 illustrates an exemplary arrangement 100 for inferring topics from a multimodal file, for example, inferring topics with entity linking and ontological data. Some examples of arrangement 100 may be at least partially implemented on computing device 500 of FIG. 5 or cloud video indexing service 612 for inferring topics with entity linking and ontological data of FIG. 6. Arrangement 100 operates on a received multimodal file 102 having a video portion 104 and an audio portion 106. In some examples, multimodal file 102 may have either a video portion 104 or an audio portion 106. Video portion 104 is a visual channel, and audio portion 106 is an audio channel. Received multimodal file 102 is shown in a file library 108, which may contain additional multimodal and other files. An entity extraction component 110 ingests received multimodal file 102 to extract entities that will be used to generate an indexed file 192.

Entity extraction component 110 comprises an object detection component 112 and a speech to text component 124, which together are operative to extract a set of entities from received multimodal file 102. Some examples of object detection component 112 are operative to perform face recognition, using a face recognition component 114 that consults an object library 116. As illustrated, in support of face recognition operations, object library 116 includes a set of face images 118 and a set of names 120 associated with set of face images 118. If one of the facial images in set of face images 118 is recognized in video portion 104 of received multimodal file 102 by face recognition component 114, then a name (corresponding to that facial image) from set of names 120 will become one of the detected objects in set of detected objects 122. In some scenarios, there may be multiple detected objects in set of detected objects 122 found in video portion 104 of received multimodal file 102 by face recognition component 114. In some examples, images of icons may be detected and indicated in set of detected objects 122.

Speech to text component 124 is operative to extract entity information from audio portion 106 of received multimodal file 102 and thereby generate a transcript 132 of audio portion 106. Some examples of speech to text component 124 may have multi-lingual capacity and therefore operative to extract entity information in at least two different languages. An alternative language component 126 identifies a language used in audio portion 106 of received multimodal file 102 and performs a speech to text process in the identified language. A text translation component 128, using a language translation library 130, is then able to translate textual portions of transcript 132.

An entity identification component 134 includes a named entity recognition (NER) component 136 that recognizes names of entities extracted by entity extraction component 110, and writes these into an extracted set of entities 142. A library of entity names 138 may draw from Wikipedia, Bing, ELIS, and other data sources. For example an entity name may correspond to a particular Wikipedia page. A disambiguation component 140 is operative to disambiguate among a set of detected names. For example, a detected name Apple may be disambiguated to be identified as either the large well-known company or a particular type of fruit, based on the context of how the word was used. After object detection, speech to text, name recognition, and disambiguation, entities will be stored in extracted set of entities 142.

An entity linking component 144 ingests extracted set of entities 142 and is operative to link extracted set of entities 142 to produce a set of linked entities 146. In some examples, ELIS is used for entity linking component 144. An information retrieval component 148 is operative to obtain entity reference information 152 for extracted set of entities 142 from an entity library 150, for example, from Wikipedia pages, Bing, or other sources of ontological data. In some examples, Wikipedia pages may be downloaded and stored in a local archive, for rapid searching without network latency. In such systems, the archive (e.g., entity library 150) may be updated periodically. The hits in entity library 150 corresponding to extracted set of entities 142 from entity reference information 152. This entity reference information 152 may be used for graphing, for example by providing a basis for similarity determination among set of linked entities 146.

A categorization component 154 produces categorization data 156 by extracting categories from entity reference information 152. In data sets, categories are intended to group together similar subjects. For example in Wikipedia, categories are implemented by a MediaWiki feature that adds any page with text such as [[Category:XYZ]] in its wikimarkup to the automated listing that is the category with name XYZ. This assists locating entities when the name may be unknown, initially.

A graphing and analysis component 158 (comprising multiple components 160-172) is operative to generate a graph of the set of linked entities, the graph comprising nodes and edges. See FIG. 2 for an example of a graph 200. The nodes represent entities in set of linked entities 146, and edges representing the similarities between the entities, portrayed as distances in graph 200 of FIG. 2. It should be understood, however, that a graph is a data construct, and may not be displayed as an image. For example, graphing and analysis component 158 generates a graph when a graph modeling component 160 operates on set of linked entities 146 to produce graph data 162. In some examples, term frequency-inverse document frequency (TFIDF) and cosine similarity are used to determine (estimate) distances and similarities between entities. TFIDF is a natural language processing statistic that is intended to reflect how important a word is to a document, and is often used as a weighting factor in searches of information retrieval, text mining, and modeling.

A partition and clustering component 164 determine clusters in the graph, based at least on the nodes and edges of the graph that may be found within graph data 162. In some examples, a modularity algorithm may be used. A cluster analysis component 166 produces cluster data 168 and may optionally also determine significant clusters and insignificant clusters in the determined clusters. A significant cluster is one with a sufficiently high clustering coefficient, which is a measure of the degree to which nodes in a graph tend to cluster together. Cluster data 168 may be used for identifying topic candidates, one of which may eventually become a TopicID representing a cluster. That is, based at least on the clusters in the graph, cluster analysis component 166 identifies topic candidates.

A feature extraction component 170 extracts features from the clusters in the graph, using cluster data 168, to produce feature data 172. The extracted features identify significance of each topic candidate, permitting a estimation of the probability (likelihood) that the topic candidate will make a good representation of a cluster. In some examples, extracting features from the clusters in the graph comprises extracting features from the significant clusters in the graph. In some examples, extracting features from the clusters in the graph comprises at least one process selected from the list consisting of determining a graph diameter and determining a Jaccard coefficient for the edges. Graph diameter is a measure of how spread or concentrated a cluster is arranged. A Jaccard coefficient is a statistic used for comparing the similarity and diversity of sample sets. The Jaccard coefficient measures similarity between finite sample sets, and is defined as the size of the intersection divided by the size of the union of the sample sets. The Jaccard distance, which measures dissimilarity between sample sets, is complementary to the Jaccard coefficient and is obtained by subtracting the Jaccard coefficient from 1, or, equivalently, by dividing the difference of the sizes of the union and the intersection of two sets by the size of the union.

Although the graph modeling and clustering is unsupervised learning, feature extraction and ranking may be implemented with supervised learning. A training component 174 may use training data 176 to train neural net classifiers that are used for ranking topic candidates. In some examples, training data 176 may include labeled files, used as a truth model. A TopicID Selection component 178 is operative to rank topic candidates within at least one cluster, and based at least on the ranking, select at least one TopicID from among the topic candidates to represent at least one cluster. A ranking component 180 may perform the ranking operations to produce ranking data 182. As part of selecting at least one TopicID to represent at least one cluster, ranking component 180 may, based at least on the extracted features, map topic candidates into a probability interval. In some examples, this may include using logistic regression and or support vector machine (SVM). SVM is a supervised learning based algorithm that analyzes data used for classification and regression analysis. In some examples, centrality, the number of appearances, and an L2 norm (possibly weighted by cluster size) may be used.

Ranking component 180 maps topic candidates into a probability interval, in some examples, the probability interval may be (0,1). Based at least on the mapping, ranking component 180 then ranks topic candidates within the at least one cluster by ordering them to find the highest probability value in ranking data 182. Based at least on the ranking, ranking component 180 selects at least one TopicID from among the topic candidates to represent at least one cluster. This is entered into selected TopicIDs 184. In some examples, each significant cluster will have its own TopicID. Therefore, a single received multimodal file 102 may produce multiple TopicIDs as selected TopicIDs 184.

In some examples, a translation component 186 provides multi-lingual capability, using a language library 188 to translating a TopicID from selected TopicIDs 184, if received multimodal file 102 was in a different language, or some other need exists for translation. Thus, even if received multimodal file 102 was in a different language than the language in which arrangement 100 operates, the TopicIDs may be located and translated back for video indexing. A video indexer component 190 is operative to index the received multimodal file 102 with the at least one TopicID to produce an indexed file 192. Indexed file 192 includes video portion 104, audio portion 106, and index data 194. Index data 194 includes at least one TopicID from selected TopicIDs 184, along with time indexing information. In this manner, with video indexing, a TopicID may be linked to the timeline of indexed file 192. In some examples, indexing the received multimodal file 102 with the at least one TopicID comprises indexing received multimodal file 102 with at least one translated TopicID.

Figure 2:
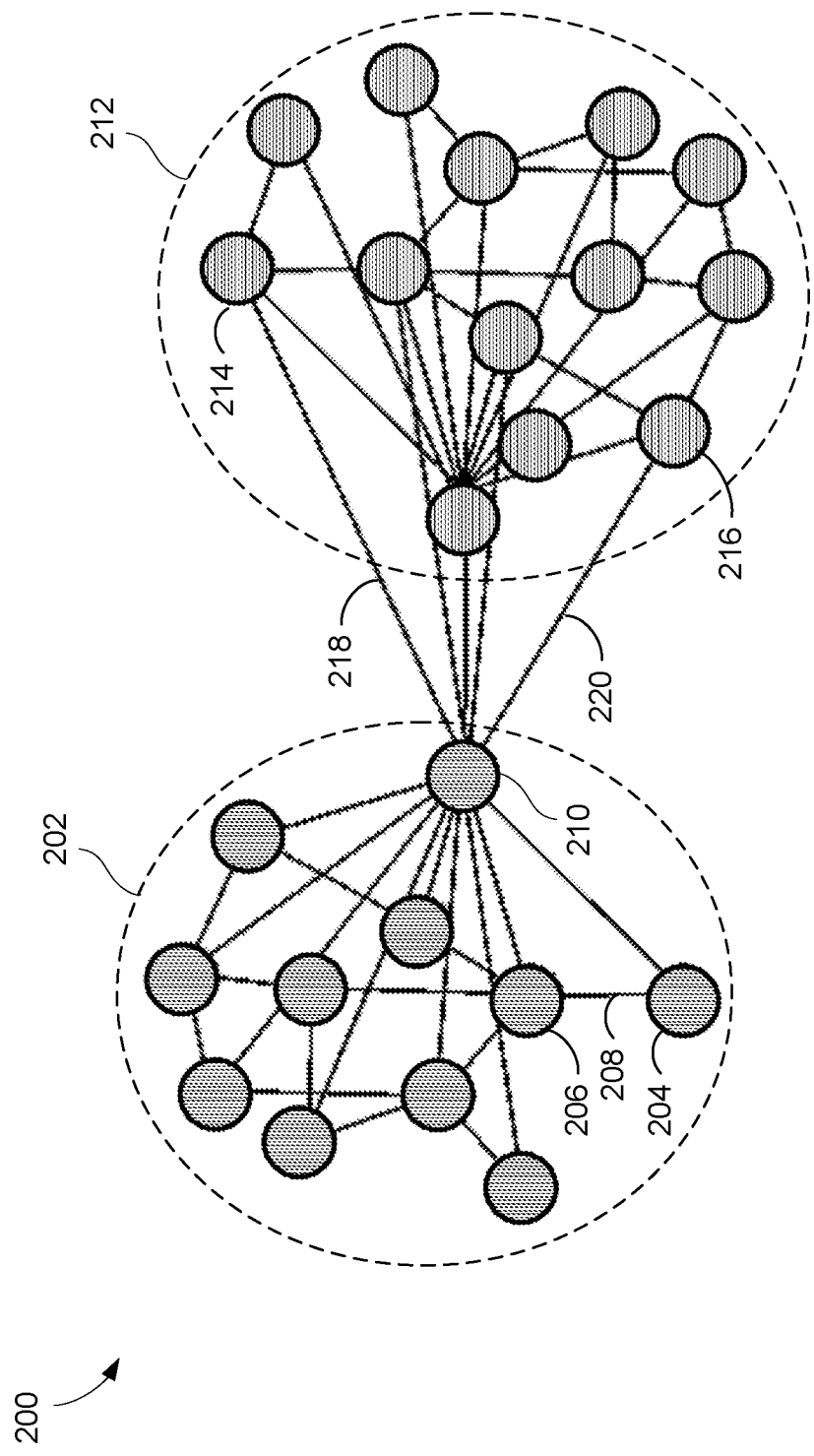
FIG. 2 illustrates an exemplary graph that may be used by the arrangement of FIG. 1.

FIG. 2 illustrates an exemplary graph 200 that may be used by arrangement 100 of FIG. 1. Graph 200 has two clusters 202 and 214, although it should be understood that this is an example and other graphs may have a different number of clusters. Cluster 202 includes 11 nodes, for example nodes 204 and 206. In graph 200, the nodes represent entities, and the lines connecting the nodes are edges, representing the similarities between the entities. For example, edge 208 is the similarity (or distance in graph 200) between the entity represented by node 204 and the entity represented by node 206.

Clusters 202 and 212 are found by a partitioning algorithm, and are a result of some nodes being clustered more tightly, with more similarity (less distance), in groups. For example, edge 208, between node 204 and node 206, indicates a higher similarity than either edge 218, between node 210 and node 214, or edge 220, between node 210 and node 216. Thus, node 204 and node 206 are both within the same cluster (cluster 202), whereas node 210 is in a different cluster than node 214 and node 216.

Figure 3:
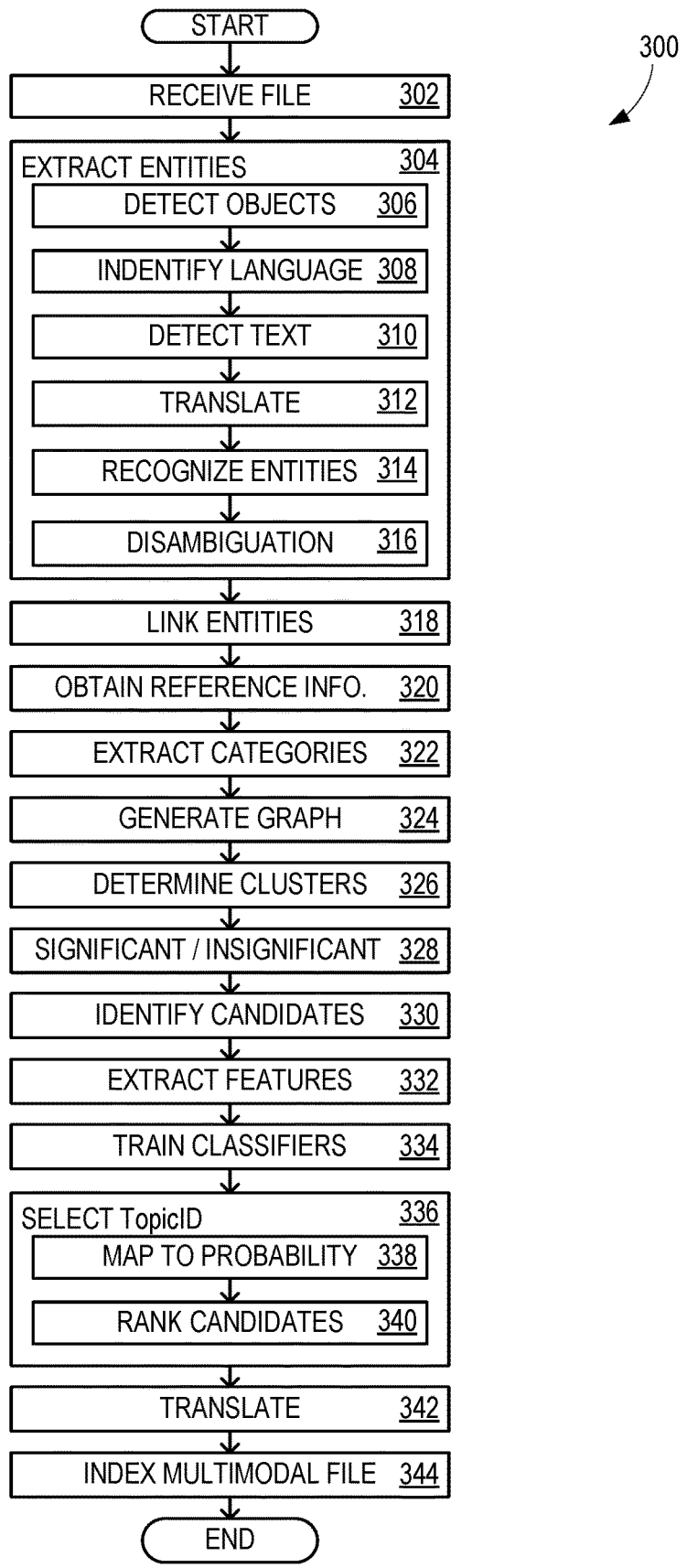
FIG. 3 is a flow chart illustrating exemplary operations involved in inferring topics from a multimodal file that may be used with the arrangement of FIG. 1.

FIG. 3 is a flow chart 300 illustrating exemplary operations involved in inferring topics from a multimodal file that may be used with the arrangement of FIG. 1. The operations illustrated in FIG. 3 may be performed by any suitable processing unit, such as computing device 500 of FIG. 5. Flow chart 300 begins in operation 302 by receiving a multimodal file, and operation 304 includes extracting a set of entities from the multimodal file. Extracting a set of entities from the multimodal file includes, for example, detecting objects in the video portion of the multimodal file and detecting text in the audio portion of the multimodal file. Operation 304 includes further operations 306-314. In operation 306, some examples of detecting objects comprises performing face recognition. For multi-lingual capability, operation 308 includes identifying a language (or possibly languages) used in the audio portion of the multimodal file. Operation 310 then involves detecting text by performing a speech to text process, and for multi-lingual operation, performing a speech to text process comprises performing a speech to text process in the identified language (or languages). Additional multi-lingual operation is enabled by operation 312 translating the detected text, if necessary. Entities are recognized in operation 314, for example, using NER and/or entities in ELIS, Wikipedia, Bing, and other sources of entity names. Operation 316 then includes disambiguating among a set of detected entity names, and a set of extracted entities is available for graphing.

Operation 318 includes linking the set of entities to produce a set of linked entities, and operation 320 includes obtaining reference information for the set of entities. For example, Wikipedia may be used, perhaps a local archive version, or other sources of ontological data. Operation 322 includes extracting categories from the reference information for the set of entities. In some data sets, categories are intended to group together similar subjects. For example in Wikipedia, categories are implemented by a MediaWiki feature that adds any page with text such as [[Category:XYZ]] in its wikimarkup to the automated listing that is the category with name XYZ. This assists locating entities when the name may be unknown, initially. For example, every Wikipedia page belongs to at least one category, although a particular page may be in several categories.

In operation 324, a graph of the set of linked entities, comprising nodes and edges is generated, based at least on the reference information. Operation 326 includes, based at least on the nodes and edges of the graph, determining clusters in the graph. See, for example, clusters 202 and 212 of FIG. 2. Operation 328 includes determining significant clusters and insignificant clusters in the determined clusters, and operation 330 includes, based at least on the clusters in the graph, identifying topic candidates. Operation 332 then includes extracting features from the clusters in the graph, and in some examples, extracting features from the clusters in the graph comprises extracting features from the significant clusters in the graph. In some examples, extracting features from the clusters in the graph comprises at least one process selected from the list consisting of determining a graph diameter and determining a Jaccard coefficient. Classifiers are trained in operation 334, to be used for supervised learning in processes related to feature extraction. Training may use labeled files as a truth model.

Based at least on the extracted features, operation 336 selects at least one TopicID from among the topic candidates to represent at least one cluster. For example, a particular graph may have multiple clusters, and each cluster will have a TopicID representing that cluster. The selected TopicID should be an entity that represents the other entities within that same cluster well. Operation 336 includes further operations 338 and 340. Operation 338 involves mapping topic candidates into a probability interval, and based at least on the mapping, operation 340 ranks candidates within the at least one cluster. The TopicID is selected based at least on the ranking. For example, the candidate having the highest probability may be the one selected as the TopicID. In some examples, ranking topic candidates comprises at least one process selected from the list consisting of logistic regression and SVM.

For multi-lingual scenarios, operation 342 includes translating the at least one TopicID. Operation 344 then includes indexing the multimodal file with the at least one TopicID. For multi-lingual scenarios, operation 344 may include indexing the multimodal file with the at least one translated TopicID.

Figure 4:
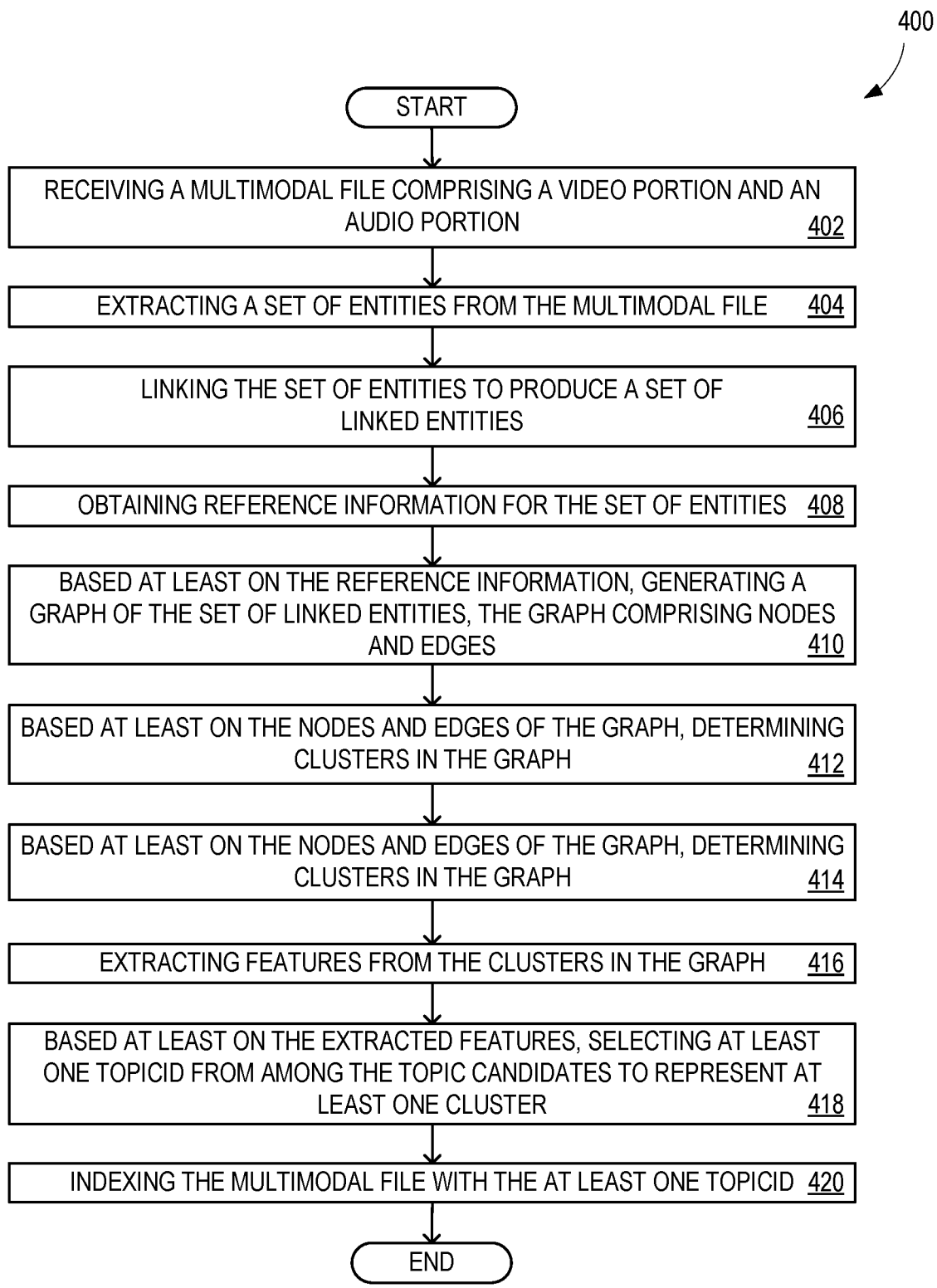
FIG. 4 is another flow chart illustrating exemplary operations involved in inferring topics from a multimodal file that may be used with the arrangement of FIG. 1.

FIG. 4 is a flow chart 400 illustrating exemplary operations involved in inferring topics from a multimodal file that may be used with the arrangement of FIG. 1. The operations illustrated in FIG. 4 may be performed by any suitable processing unit, such as computing device 500 of FIG. 5. Operation 402 includes receiving a multimodal file. In some examples, the multimodal file may include a video portion or an audio portion. In some examples, the multimodal file may include both a video portion and an audio portion. Operation 404 includes extracting a set of entities from the multimodal file. Operation 406 includes linking the set of entities to produce a set of linked entities, and operation 408 includes obtaining reference information for the set of entities. Operation 410 includes, based at least on the reference information, generating a graph of the set of linked entities, the graph comprising nodes and edges. Operation 412 includes, based at least on the nodes and edges of the graph, determining clusters in the graph. Operation 414 includes, based at least on the clusters in the graph, identifying topic candidates, and operation 416 includes extracting features from the clusters in the graph. Operation 418 includes, based at least on the extracted features, selecting at least one TopicID from among the topic candidates to represent at least one cluster; and operation 420 includes indexing the multimodal file with the at least one TopicID.

ADDITIONAL EXAMPLES

Some examples are directed to a system for inferring topics from a multimodal file that comprises: an entity extraction component comprising an object detection component and a speech to text component, operative to extract a set of entities from a multimodal file comprising a video portion and an audio portion; an entity linking component operative to link the extracted set of entities to produce a set of linked entities; an information retrieval component operative to obtain reference information for the set of entities; a graphing and analysis component operative to: generate a graph of the set of linked entities, the graph comprising nodes and edges; based at least on the nodes and edges of the graph, determine clusters in the graph; based at least on the clusters in the graph, identify topic candidates; and extract features from the clusters in the graph; a TopicID selection component operative to: rank the topic candidates within at least one cluster; and based at least on the ranking, select at least one TopicID from among the topic candidates to represent at least one cluster; and a video indexer operative to index the multimodal file with the at least one TopicID.

Some examples are directed to a method of inferring topics from a multimodal file that comprises: receiving a multimodal file; extracting a set of entities from the multimodal file; linking the set of entities to produce a set of linked entities; obtaining reference information for the set of entities; based at least on the reference information, generating a graph of the set of linked entities, the graph comprising nodes and edges; based at least on the nodes and edges of the graph, determining clusters in the graph; based at least on the clusters in the graph, identifying topic candidates; extracting features from the clusters in the graph; based at least on the extracted features, selecting at least one TopicID from among the topic candidates to represent at least one cluster; and indexing the multimodal file with the at least one TopicID.

Some examples are directed to one or more computer storage devices having computer-executable instructions stored thereon for inferring topics from a multimodal file, which, on execution by a computer, cause the computer to perform operations comprising: receiving a multimodal file comprising a video portion and an audio portion; extracting a set of entities from the multimodal file, wherein extracting a set of entities from the multimodal file comprises: detecting objects in the video portion of the multimodal file with face recognition; detecting text in the audio portion of the multimodal file with a speech to text process; and disambiguating among a set of detected entity names; linking the set of entities to produce a set of linked entities; obtaining reference information for the set of entities; based at least on the reference information, generating a graph of the set of linked entities, the graph comprising nodes and edges; based at least on the nodes and edges of the graph, determining clusters in the graph; determining significant clusters and insignificant clusters in the determined clusters; based at least on the significant clusters in the graph, identifying topic candidates; extracting features from the significant clusters in the graph; based at least on the extracted features, mapping the topic candidates into a probability interval; based at least on the mapping, ranking the topic candidates within the at least one cluster, based on the ranking, selecting at least one TopicID from among the topic candidates to represent at least one cluster; and indexing the multimodal file with the at least one TopicID.

Alternatively or in addition to the other examples described herein, some examples include any combination of the following: the multimodal file comprises a video portion and an audio portion and wherein extracting a set of entities from the multimodal file comprises detecting objects in the video portion of the multimodal file and detecting text in the audio portion of the multimodal file; the object detection component is operative to perform face recognition; detecting objects comprises performing face recognition; the speech to text component is operative to extract entity information in at least two different languages; detecting text comprises performing a speech to text process; identifying a language used in the audio portion of the multimodal file, wherein performing a speech to text process comprises performing a speech to text process in the identified language; detecting text in the audio portion of the multimodal file with a speech to text process comprises performing a speech to text process in the identified language; translating the detected text; a disambiguation component operative to disambiguate among a set of detected entity names; extracting a set of entities from the multimodal file further comprises disambiguating among a set of detected entity names; extracting categories from the reference information for the set of entities; determining significant clusters and insignificant clusters in the determined clusters, wherein extracting features from the clusters in the graph comprises extracting features from the significant clusters in the graph; extracting features from the clusters in the graph comprises at least one process selected from the list consisting of determining a graph diameter and determining a Jaccard coefficient; selecting at least one TopicID to represent at least one cluster comprises, based at least on the extracted features, mapping topic candidates into a probability interval, and based at least on the mapping, ranking topic candidates within the at least one cluster, and selecting the at least one TopicID based at least on the ranking; ranking topic candidates comprises at least one process selected from the list consisting of logistic regression and SVM; a training component for training classifiers used for ranking topic candidates; and translating the at least one TopicID, wherein indexing the multimodal file with the at least one TopicID comprises indexing the multimodal file with the at least one translated TopicID.

While the aspects of the disclosure have been described in terms of various examples with their associated operations, a person skilled in the art would appreciate that a combination of operations from any number of different examples is also within scope of the aspects of the disclosure.

Example Operating Environment

Figure 5:
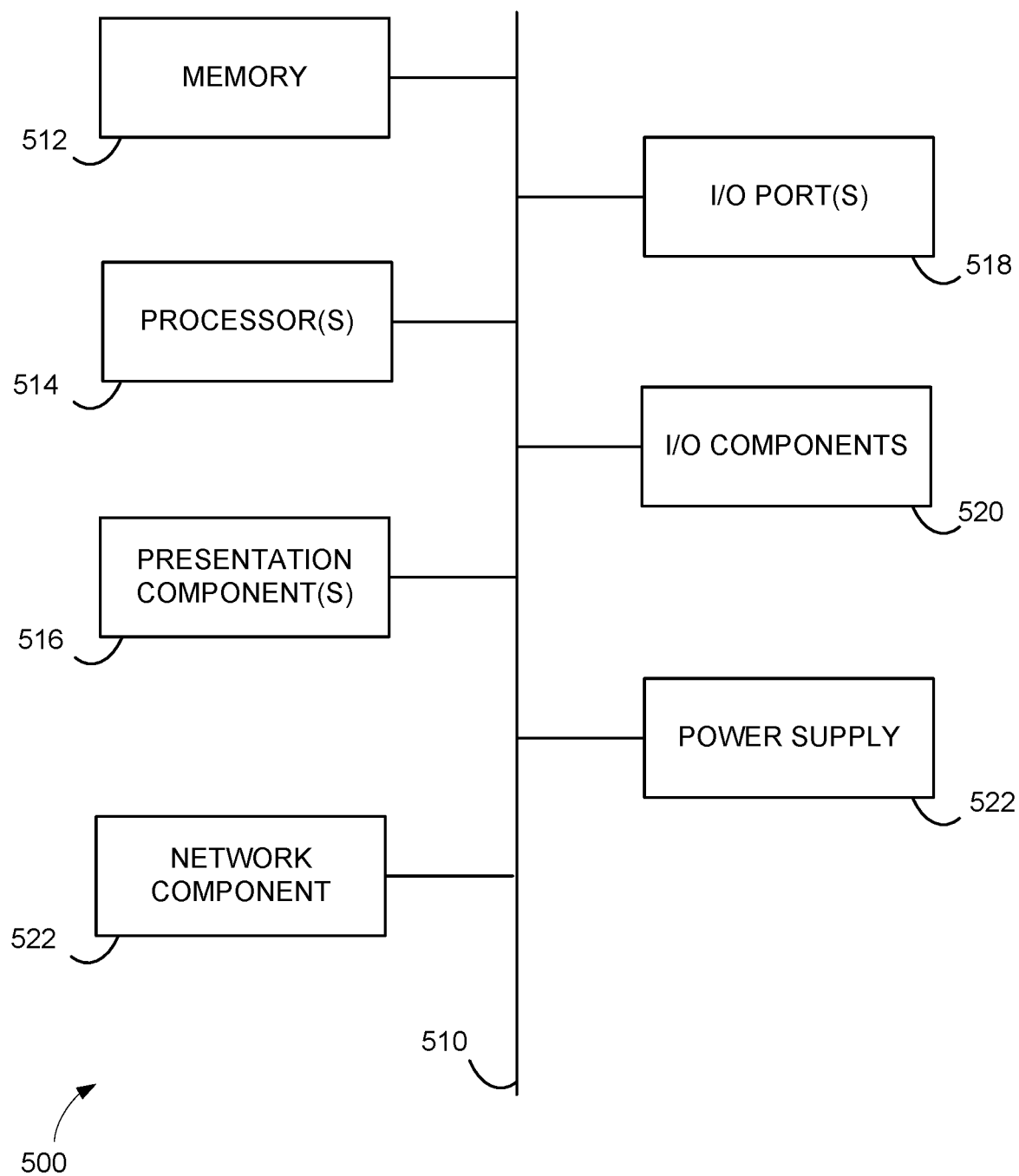
FIG. 5 is an exemplary block diagram illustrating an operating environment for a computing device suitable for implementing various aspects of the disclosure.

FIG. 5 is a block diagram of an example computing device 500 for implementing aspects disclosed herein, and is designated generally as computing device 500. Computing device 500 is one example of a suitable computing environment and is not intended to suggest any limitation as to the scope of use or functionality of the invention. Neither should the computing device 500 be interpreted as having any dependency or requirement relating to any one or combination of components/modules illustrated.

The examples and embodiments disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments, where tasks are performed by remote-processing devices that are linked through a communications network. For example, a distributed computing environment may host cloud synthetics services. Some embodiments of synthetics services may provide synthetic 3D environments as well as rendering a surface in a synthetic scene.

Computing device 500 includes a bus 510 that directly or indirectly couples the following devices: memory 512, one or more processors 514, one or more presentation components 516, input/output (I/O) ports 518, I/O components 520, a power supply 522, and a network component 524. Computing device 500 should not be interpreted as having any dependency or requirement related to any single component or combination of components illustrated therein. While computing device 500 is depicted as a seemingly single device, multiple computing devices 500 may work together and share the depicted device resources. For example, memory 512 may be distributed across multiple devices, processor(s) 514 may provide housed on different devices, and so on.

Bus 510 represents what may be one or more busses (such as an address bus, data bus, or a combination thereof). Although the various blocks of FIG. 5 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. Such is the nature of the art, and the diagram of FIG. 5 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 5 and the references herein to a "computing device."

Memory 512 may include any of the computer-readable media discussed herein. Memory 512 may be used to store and access instructions configured to carry out the various operations disclosed herein. In some examples, memory 512 includes computer storage media in the form of volatile and/or nonvolatile memory, removable or non-removable memory, data disks in virtual environments, or a combination thereof.

Processor(s) 514 may include any quantity of processing units that read data from various entities, such as memory 512 or I/O components 520. Specifically, processor(s) 514 are programmed to execute computer-executable instructions for implementing aspects of the disclosure. The instructions may be performed by the processor, by multiple processors within the computing device 500, or by a processor external to the client computing device 500. In some examples, the processor(s) 514 are programmed to execute instructions such as those illustrated in the flow charts discussed below and depicted in the accompanying drawings. Moreover, in some examples, the processor(s) 514 represent an implementation of analog techniques to perform the operations described herein. For example, the operations may be performed by an analog client computing device 500 and/or a digital client computing device 500.

Presentation component(s) 516 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 500, across a wired connection, or in other ways.

Ports 518 allow computing device 500 to be logically coupled to other devices including I/O components 520, some of which may be built in. Example I/O components 520 include, for example but without limitation, a microphone, keyboard, mouse, joystick, game pad, satellite dish, scanner, printer, wireless device, etc.

In some examples, the network component 524 includes a network interface card and/or computer-executable instructions (e.g., a driver) for operating the network interface card. Communication between the computing device 500 and other devices may occur using any protocol or mechanism over any wired or wireless connection. In some examples, the network component 524 is operable to communicate data over public, private, or hybrid (public and private) using a transfer protocol, between devices wirelessly using short range communication technologies (e.g., near-field communication (NFC), Bluetooth® branded communications, or the like), or a combination thereof.

Although described in connection with an example computing device 500, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, holographic device, and the like. Such systems or devices may accept input from the user in any way, including from input devices such as a keyboard or pointing device, via gesture input, proximity input (such as by hovering), and/or via voice input.

Figure 6:
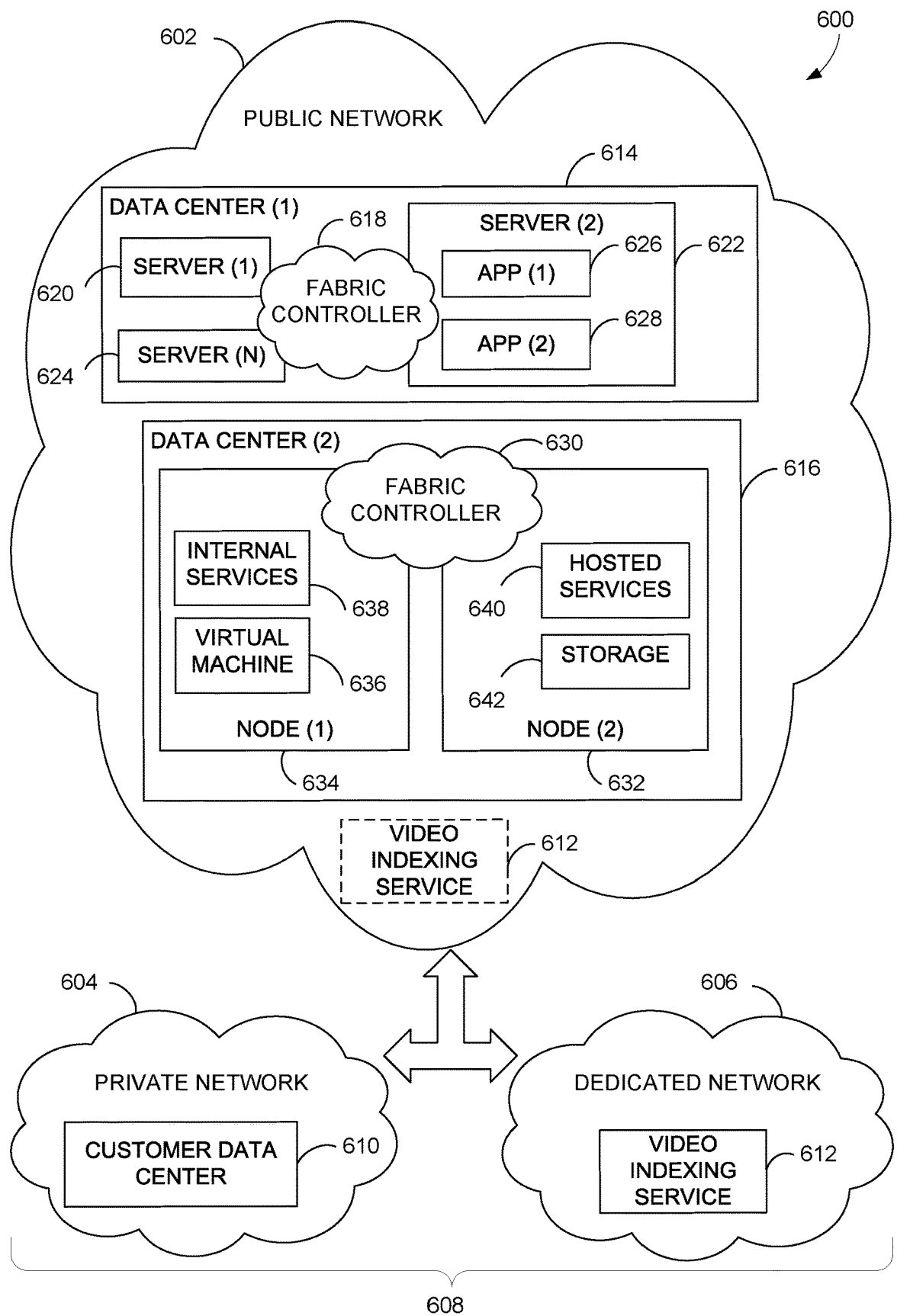
FIG. 6 is a block diagram of an example cloud-computing infrastructure suitable for implementing some of the various examples disclosed herein.

Turning now to FIG. 6, an exemplary block diagram illustrates a cloud-computing environment for providing a synthetics service. Architecture 600 illustrates an exemplary cloud-computing infrastructure, suitable for use in implementing aspects of this disclosure. Architecture 600 should not be interpreted as having any dependency or requirement related to any single component or combination of components illustrated therein. In addition, any number of nodes, virtual machines, data centers, role instances, or combinations thereof may be employed to achieve the desired functionality within the scope of embodiments of the present disclosure.

The distributed computing environment of FIG. 6 includes a public network 602, a private network 604, and a dedicated network 606. Public network 602 may be a public cloud-based network of computing resources, for example. Private network 604 may be a private enterprise network or private cloud-based network of computing resources. And dedicated network 606 may be a third-party network or dedicated cloud-based network of computing resources. In some examples, private network 604 may host a customer data center 610, and dedicated network 606 may each host a cloud video indexing service 612 for inferring topics with entity linking and ontological data.

Hybrid cloud 608 may include any combination of public network 602, private network 604, and dedicated network 606. For example, dedicated network 606 may be optional, with hybrid cloud 608 comprised of public network 602 and private network 604. Along these lines, some customers may opt to only host a portion of their customer data center 610 in the public network 602 and/or dedicated network 606, retaining some of the customers' data or hosting of customer services in the private network 604. For example, a customer that manages healthcare data or stock brokerage accounts may elect or be required to maintain various controls over the dissemination of healthcare or account data stored in its data center or the applications processing such data (e.g., software for reading radiology scans, trading stocks, etc.). Myriad other scenarios exist whereby customers may desire or need to keep certain portions of data centers under the customers' own management. Thus, in some examples, customer data centers may use a hybrid cloud 608 in which some data storage and processing is performed in the public network 602 while other data storage and processing is performed in the dedicated network 606.

Public network 602 may include data centers configured to host and support operations, including tasks of a distributed application, according to the fabric controller 618. It will be understood and appreciated that data center 614 and data center 616 shown in FIG. 6 are merely examples of suitable implementations for accommodating one or more distributed applications, and are not intended to suggest any limitation as to the scope of use or functionality of examples disclosed herein. Neither should data center 614 and data center 616 be interpreted as having any dependency or requirement related to any single resource, combination of resources, combination of servers (e.g., servers 620 and 624) combination of nodes (e.g., nodes 632 and 634), or a set of application programming interfaces (APIs) to access the resources, servers, and/or nodes.

Data center 614 illustrates a data center comprising a plurality of servers, such as servers 620 and 624. A fabric controller 618 is responsible for automatically managing the servers 620 and 624 and distributing tasks and other resources within the data center 614. By way of example, the fabric controller 618 may rely on a service model (e.g., designed by a customer that owns the distributed application) to provide guidance on how, where, and when to configure server 622 and how, where, and when to place application 626 and application 628 thereon. One or more role instances of a distributed application may be placed on one or more of the servers 620 and 624 of data center 614, where the one or more role instances may represent the portions of software, component programs, or instances of roles that participate in the distributed application. In other examples, one or more of the role instances may represent stored data that are accessible to the distributed application.

Data center 616 illustrates a data center comprising a plurality of nodes, such as node 632 and node 634. One or more virtual machines may run on nodes of data center 616, such as virtual machine 636 of node 634 for example. Although FIG. 6 depicts a single virtual node on a single node of data center 616, any number of virtual nodes may be implemented on any number of nodes of the data center in accordance with illustrative embodiments of the disclosure. Generally, virtual machine 636 is allocated to role instances of a distributed application, or service application, based on demands (e.g., amount of processing load) placed on the distributed application. As used herein, the phrase "virtual machine" is not meant to be limiting, and may refer to any software, application, operating system, or program that is executed by a processing unit to underlie the functionality of the role instances allocated thereto. Further, the virtual machine(s) 636 may include processing capacity, storage locations, and other assets within the data center 616 to properly support the allocated role instances.

In operation, the virtual machines are dynamically assigned resources on a first node and second node of the data center, and endpoints (e.g., the role instances) are dynamically placed on the virtual machines to satisfy the current processing load. In one instance, a fabric controller 630 is responsible for automatically managing the virtual machines running on the nodes of data center 616 and for placing the role instances and other resources (e.g., software components) within the data center 616. By way of example, the fabric controller 630 may rely on a service model (e.g., designed by a customer that owns the service application) to provide guidance on how, where, and when to configure the virtual machines, such as virtual machine 636, and how, where, and when to place the role instances thereon.

As described above, the virtual machines may be dynamically established and configured within one or more nodes of a data center. As illustrated herein, node 632 and node 634 may be any form of computing devices, such as, for example, a personal computer, a desktop computer, a laptop computer, a mobile device, a consumer electronic device, a server, the computing device 500 of FIG. 5, and the like. In one instance, the nodes 632 and 634 host and support the operations of the virtual machine(s) 636, while simultaneously hosting other virtual machines carved out for supporting other tenants of the data center 616, such as internal services 638, hosted services 640, and storage 642. Often, the role instances may include endpoints of distinct service applications owned by different customers.

Typically, each of the nodes include, or is linked to, some form of a computing unit (e.g., central processing unit, microprocessor, etc.) to support operations of the component(s) running thereon. As utilized herein, the phrase "computing unit" generally refers to a dedicated computing device with processing power and storage memory, which supports operating software that underlies the execution of software, applications, and computer programs thereon. In one instance, the computing unit is configured with tangible hardware elements, or machines, that are integral, or operably coupled, to the nodes to enable each device to perform a variety of processes and operations. In another instance, the computing unit may encompass a processor (not shown) coupled to the computer-readable medium (e.g., computer storage media and communication media) accommodated by each of the nodes.

The role of instances that reside on the nodes may be to support operation of service applications, and thus they may be interconnected via APIs. In one instance, one or more of these interconnections may be established via a network cloud, such as public network 602. The network cloud serves to interconnect resources, such as the role instances, which may be distributed across various physical hosts, such as nodes 632 and 634. In addition, the network cloud facilitates communication over channels connecting the role instances of the service applications running in the data center 616. By way of example, the network cloud may include, without limitation, one or more communication networks, such as local area networks (LANs) and/or wide area networks (WANs). Such communication networks are commonplace in offices, enterprise-wide computer networks, intranets, and the Internet, and therefore need not be discussed at length herein.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of inferring topics from a multimodal file, the method comprising:
   receiving a multimodal file;
   extracting a set of entities from the multimodal file;
   linking the set of entities to produce a set of linked entities;
   obtaining reference information for the set of entities;
   based at least on the reference information, generating a graph of the set of linked entities, the graph comprising nodes and edges;

based at least on the nodes and edges of the graph, determining clusters in the graph;

based at least on the clusters in the graph, identifying topic candidates;

extracting features from the clusters in the graph;

based at least on the extracted features, mapping the topic candidates into a probability interval for at least one cluster;

based at least on the mapping, ranking the topic candidates within the at least one cluster;

based at least on the ranking, selecting at least one TopicID from among the topic candidates to represent the at least one cluster; and indexing the multimodal file with the at least one TopicID.

2. The method of claim 1 wherein the multimodal file comprises a video portion and an audio portion and wherein extracting a set of entities from the multimodal file comprises:

detecting objects in the video portion of the multimodal file; and detecting text in the audio portion of the multimodal file.

3. The method of claim 2 wherein detecting objects comprises performing face recognition.

4. The method of claim 2 wherein detecting text comprises performing a speech to text process.

5. The method of claim 4 further comprising:

identifying a language used in the audio portion of the multimodal file, and wherein performing a speech to text process comprises performing a speech to text process in the identified language.

6. The method of claim 4 further comprising:

translating the detected text.

7. The method of claim 1 wherein extracting a set of entities from the multimodal file further comprises disambiguating among a set of detected entity names.

8. The method of claim 1 further comprising:

extracting categories from the reference information for the set of entities.

9. The method of claim 1 further comprising:

determining significant clusters and insignificant clusters in the determined clusters, and wherein extracting features from the clusters in the graph comprises extracting features from the significant clusters in the graph.

10. The method of claim 1 wherein extracting features from the clusters in the graph comprises at least one process selected from the list consisting of:

determining a graph diameter and determining a Jaccard coefficient.

11. The method of claim 1 wherein indexing the multimodal file with the at least one TopicID further comprises:

generating index data for the multimodal file to produce an indexed file, the index data including the at least one TopicID and corresponding time indexing information.

12. The method of claim 1 wherein ranking topic candidates comprises at least one process selected from the list consisting of:

logistic regression and support vector machine (SVM).

13. The method of claim 1 further comprising:

translating the at least one TopicID, and wherein indexing the multimodal file with the at least one TopicID comprises indexing the multimodal file with the at least one translated TopicID.

14. A system for inferring topics from a multimodal file, the system comprising:

an entity extraction component comprising an object detection component and a speech to text component, that extracts a set of entities from a multimodal file comprising a video portion and an audio portion;

an entity linking component that links the extracted set of entities to produce a set of linked entities;

an information retrieval component that obtains reference information for the extracted set of entities;

a graphing and analysis component that:

generates a graph of the set of linked entities, the graph comprising nodes and edges;

based at least on the nodes and edges of the graph, determines clusters in the graph;

based at least on the clusters in the graph, identifies topic candidates; and extracts features from the clusters in the graph;

a TopicID selection component that:

maps the topic candidates into a probability interval for at least one cluster based at least on the extracted features;

ranks the topic candidates within the at least one cluster based at least on the mapping; and based at least on the ranking, selects at least one TopicID from among the topic candidates to represent the at least one cluster; and a video indexer that indexes the multimodal file with the at least one TopicID.

15. The system of claim 14 wherein the object detection component further performs face recognition.

16. The system of claim 14 wherein the speech to text component extracts entity information in at least two different languages.

17. The system of claim 14 further comprising:

a disambiguation component that disambiguates among a set of detected entity names.

18. The system of claim 14 further comprising:

a training component for training classifiers used for ranking topic candidates.

19. One or more computer storage devices having computer-executable instructions stored thereon for inferring topics from a multimodal file, which, on execution by a computer, cause the computer to perform operations comprising:

receiving a multimodal file comprising a video portion and an audio portion;

extracting a set of entities from the multimodal file, wherein extracting a set of entities from the multimodal file comprises:

detecting objects in the video portion of the multimodal file with face recognition;

detecting text in the audio portion of the multimodal file with a speech to text process; and disambiguating among a set of detected entity names;

linking the set of entities to produce a set of linked entities;

obtaining reference information for the set of entities;

based at least on the reference information, generating a graph of the set of linked entities, the graph comprising nodes and edges;

based at least on the nodes and edges of the graph, determining clusters in the graph;

determining significant clusters and insignificant clusters in the determined clusters;

based at least on the significant clusters in the graph, identifying topic candidates;

extracting features from the significant clusters in the graph;

based at least on the extracted features, mapping the topic candidates into a probability interval;

based at least on the mapping, ranking the topic candidates within at least one significant cluster, based on the ranking, selecting at least one TopicID from among the topic candidates to represent the at least one significant cluster; and indexing the multimodal file with the at least one TopicID.

20. The one or more computer storage devices of claim 19 wherein the operations further comprise:

identifying a language used in the audio portion of the multimodal file, and detecting text in the audio portion of the multimodal file with a speech to text process comprises performing a speech to text process in the identified language.

* * * * *